US010614360B2

United States Patent
Walters et al.

(10) Patent No.: US 10,614,360 B2
(45) Date of Patent: Apr. 7, 2020

(54) AUTOMATICALLY SCALING NEURAL NETWORKS BASED ON LOAD

(71) Applicant: Capital One Services, LLC, McLean, VA (US)

(72) Inventors: Austin Walters, Savoy, IL (US); Jeremy Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/260,370

(22) Filed: Jan. 29, 2019

(65) Prior Publication Data
US 2019/0251443 A1    Aug. 15, 2019

Related U.S. Application Data

(63) Continuation of application No. 15/892,819, filed on Feb. 9, 2018, now Pat. No. 10,235,625.

(51) Int. Cl.
*G06N 3/08* (2006.01)
*G06N 3/04* (2006.01)
*G06F 9/50* (2006.01)
*G06N 3/063* (2006.01)

(52) U.S. Cl.
CPC ............. *G06N 3/082* (2013.01); *G06F 9/505* (2013.01); *G06N 3/04* (2013.01); *G06N 3/08* (2013.01); *G06N 3/063* (2013.01)

(58) Field of Classification Search
None
See application file for complete search history.

(56) References Cited

U.S. PATENT DOCUMENTS

| | | | |
|---|---|---|---|
| 9,336,483 B1 * | 5/2016 | Abeysooriya | ............ G06N 3/08 |
| 2013/0290223 A1 | 10/2013 | Chapelle et al. | |
| 2013/0325775 A1 | 12/2013 | Sinyayskiy et al. | |
| 2015/0324690 A1 | 11/2015 | Chilimbi et al. | |
| 2017/0178027 A1 | 6/2017 | Duggan et al. | |
| 2017/0213156 A1 | 7/2017 | Hammond et al. | |
| 2017/0264493 A1 | 9/2017 | Cencini et al. | |
| 2017/0344910 A1 | 11/2017 | Wu | |
| 2018/0046914 A1 * | 2/2018 | Li | ........................ G06N 3/0445 |

(Continued)

OTHER PUBLICATIONS

Balavoine, et al., "Convergence and Rate Analysis of Neural Networks for Sparse Approximation", arXiv:1107.5988v6, Aug. 29, 2013, 13 pages.

(Continued)

*Primary Examiner* — Alan Chen
(74) *Attorney, Agent, or Firm* — DLA Piper LLP (US)

(57) ABSTRACT

In one aspect, the present disclosure relates to a method for automatically scaling a neural network including: receiving a neural network model; allocating a plurality of processing nodes for the neural network model, the number of allocated processing nodes determined based on an analysis of the neural network model; distributing training of the neural network model across the allocated processing nodes; receiving load information from the allocated processing nodes, the load information associated with the training of the neural network model; and adjusting the number of allocated processing nodes based on the load information.

15 Claims, 3 Drawing Sheets

(56) References Cited

U.S. PATENT DOCUMENTS

2018/0052745 A1 2/2018 Marripudi et al.
2018/0082212 A1* 3/2018 Faivishevsky ......... G06N 20/00
2018/0314971 A1* 11/2018 Chen ................... H04L 67/1065

OTHER PUBLICATIONS

Stroppa, "Distribution Deep Learning Made Easy", Amazon.com/ AWS Compute Blog, https://aws.amazon.com/blogs/compute/distributed-deep-learning-made-easy/, Nov. 10, 2016, 10 pages.

Qiao, et al., "Litz: An Elastic Framework for High-Performance Distributed Machine Learning", Parallel Data Laboratory, Carnegie Mellon University, Jun. 2017, 19 pages.

Li, et al., "Scaling Distributed Machine Learning with the Parameter Server", Proceedings of the 2014 International Conference on Big Data Science and Computing, Jan. 1, 2014, 16 pages.

Wang, et al., "DistDL: A Distributed Deep Learning Service Schema with GPU Accelerating", APWeb 2015, LNCS 9313, Nov. 13, 2015, 12 pages.

Dean, et al., "Large Scale Distributed Deep Networks", Curran Associates, Inc., Jan. 1, 2012, 9 pages.

* cited by examiner

AUTOMATICALLY SCALING NEURAL NETWORKS BASED ON LOAD

CROSS-REFERENCE TO RELATED APPLICATIONS

This is a continuation of U.S. application Ser. No. 15/892,819, filed Feb. 9, 2018, the content of which is herein incorporated by reference in its entirety.

BACKGROUND

As is known in the art, machine intelligence (MI)—or machine learning (ML)—enables computers to learn without being explicitly programmed. MI focuses on algorithms that can learn from, and make predictions on, data.

Artificial neural networks (commonly referred to as just "neural networks") are computing systems inspired by the biological neural networks found in animal brains. Neural networks can learn tasks by considering examples, typically reducing the extent of task-specific programming. A neural network is based on a collection of connected nodes (or "artificial neurons"). Each connection between nodes can transmit a signal from one to another. The node that receives the signal can process it and then signal other nodes connected to it.

More recently, a branch of MI called "deep learning" has been deployed to achieve higher accuracy for many different tasks, including speech recognition, image recognition, and video analytics. A deep learning neural network may have millions or even billions of highly connected nodes. Although deep learning can provide higher accuracy compared to traditional MI techniques, this higher accuracy comes at the cost of higher compute requirements during training. While cloud-based computing environments make it possible to allocate a large number of compute nodes to a given problem, effectively scaling computing resources for neural networks has typically required human intervention.

SUMMARY

According to one aspect, the present disclosure relates to a method for automatically scaling a neural network including: receiving a neural network model; allocating a plurality of processing nodes for the neural network model, the number of allocated processing nodes determined based on an analysis of the neural network model; distributing training of the neural network model across the allocated processing nodes; receiving load information from the allocated processing nodes, the load information associated with the training of the neural network model; and adjusting the number of allocated processing nodes based on the load information.

In some embodiments, the load information comprises one or more metrics associated with the training of the neural network model, the one or more metrics comprising: time per step; accuracy convergence rate; or estimated time to convergence. In certain embodiments, adjusting the number of allocated processing nodes based on the load information comprises: receiving a time per step metric associated with the training of the neural network model; and increasing the number of allocated processing nodes if the time per step metric is greater than an upper time per step threshold or decreasing the number of nodes if the time per step metric is less than a lower time per step threshold. In some embodiments, adjusting the number of allocated processing nodes based on the load information comprises: receiving a target time to convergence value; receiving an estimated time to convergence metric associated with the training of the neural network model and increasing the number of allocated processing nodes if the estimated time to convergence metric is greater than the target time to convergence value, or decreasing the number of processing nodes if the estimated time to convergence metric is less than the target time to convergence value. In particular embodiments, allocating the plurality of processing nodes comprises allocating the plurality of processing nodes at a load balancer. In certain embodiments, distributing training of the neural network model across the allocated processing nodes comprises: generating a plurality of tasks associated with training the neural network model; and assigning each of the plurality of tasks to one of the allocated processing nodes.

According to another aspect, the present disclosure relates to a method for automatically scaling a neural network including: receiving a portion of a neural network model at a first processing node, the first processing node within a plurality of processing nodes allocated for the neural network model; training, at the first processing node, the portion of the neural network model; determining, at the first processing node, load information associated with the training of the neural network model; and sending the load information to a load balancer, the load balancer configured to adjust a number of processing nodes allocated for the neural network model based on the load information.

In some embodiments, the load information comprises one or more metrics associated with the training of the neural network model, the one or more metrics comprising: time per step; accuracy convergence rate; or estimated time to convergence. In certain embodiments, the load information comprises a time per step metric, wherein the load balancer is configured to adjust the number of allocated processing nodes based on comparing the time per step metric to an upper time per step threshold. In some embodiments, the load information comprises an estimated time to convergence metric, and the load balancer is configured to adjust the number of allocated processing nodes based on comparing the estimated time to convergence to a target time to convergence value. In particular embodiments, receiving a portion of a neural network model comprises receiving a task associated with training the neural network model.

According to another aspect of the present disclosure, a system comprises a processor, a volatile memory, and a non-volatile memory. The non-volatile memory stores computer program code that when executed on the processor causes the processor to execute a process operable to: receive a neural network model; allocate a plurality of processing nodes for the neural network model, the number of allocated processing nodes determined based on an analysis of the neural network model; distribute training of the neural network model across the allocated processing nodes; receive load information from the allocated processing nodes, the load information associated with the training of the neural network model; and adjust the number of allocated processing nodes based on the load information.

In some embodiments, the load information comprises one or more metrics associated with the training of the neural network model, the one or more metrics comprising: time per step; accuracy convergence rate; or estimated time to convergence. In certain embodiments, adjusting the number of allocated processing nodes based on the load information comprises: receiving a time per step metric associated with the training of the neural network model; and increasing the number of allocated processing nodes if the time per step metric is greater than an upper time per step threshold or decreasing the number of nodes if the time per step metric is less than a lower time per step threshold.

In some embodiments, adjusting the number of allocated processing nodes based on the load information comprises: receiving a target time to convergence value; receiving an estimated time to convergence metric associated with the training of the neural network model; and increasing the number of allocated processing nodes if the estimated time to convergence metric is greater than the target time to convergence value, or decreasing the number of allocated processing nodes if the estimated time to convergence metric is less than the target time to convergence value. In certain embodiments, allocating the plurality of processing nodes comprises allocating the plurality of processing nodes at a load balancer. In particular embodiments, distributing training of the neural network model across the allocated processing nodes comprises: generating a plurality of tasks associated with training the neural network model; and assigning each of the plurality of tasks to one of the allocated processing nodes.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings.

The drawings are not necessarily to scale, or inclusive of all elements of a system, emphasis instead generally being placed upon illustrating the concepts, structures, and techniques sought to be protected herein.

DETAILED DESCRIPTION

As used herein, the term "neural network model" refers to an electronic representation of a neural network, including its node biases, node connections, and connection weights. Although embodiments of the present disclosure may be described with reference to neural networks, it will be appreciated that the concepts and techniques sought to be protected herein are not limited to neural networks but can be applied to other forms of machine intelligence and learning.

Figure 1:
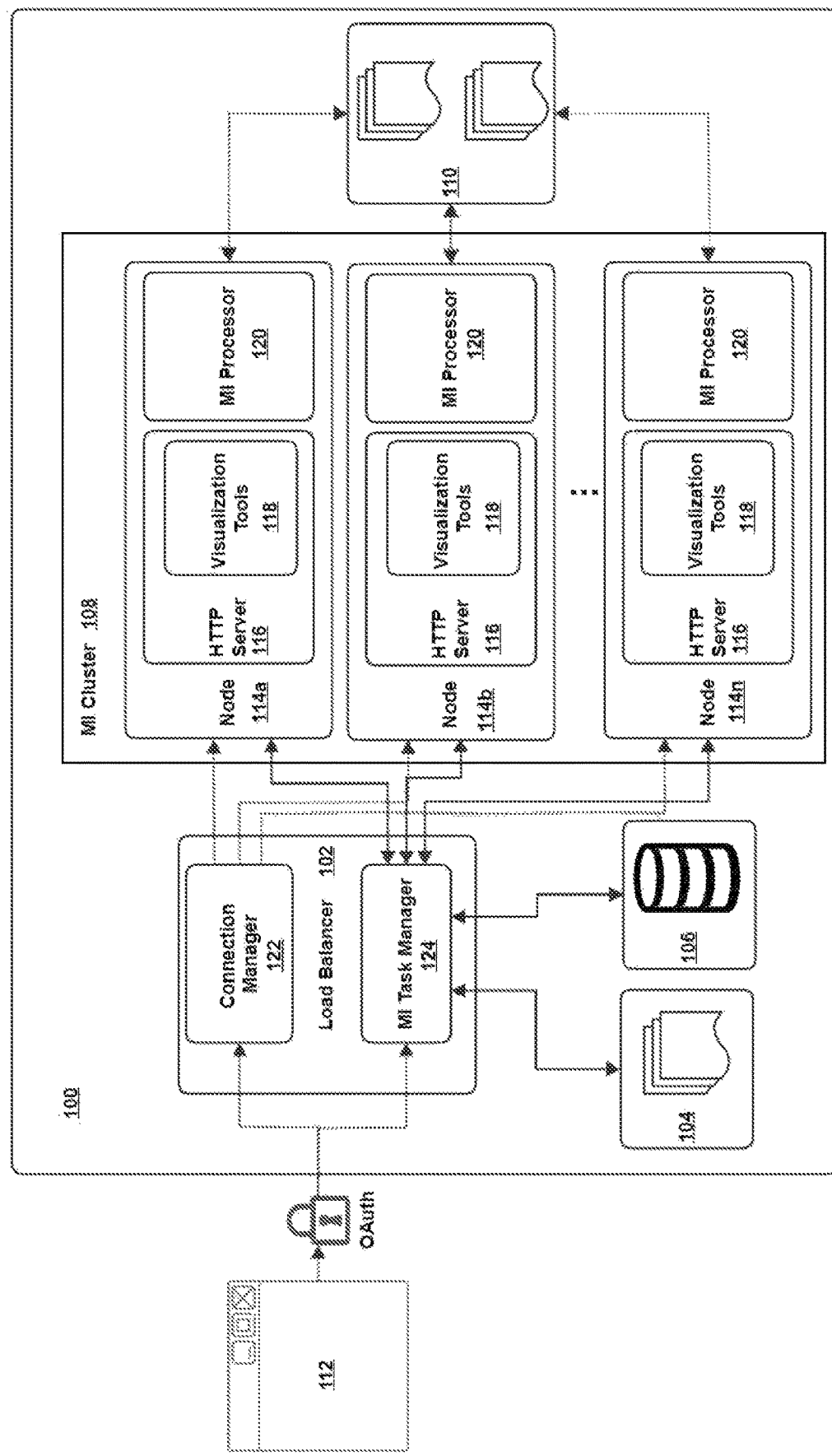
FIG. 1 is a diagram of a scalable system for machine intelligence, according to some embodiments of the present disclosure.

FIG. 1 shows a scalable system 100 for machine intelligence, according to an embodiment of the present disclosure. The system 100 comprises a load balancer 102, a first file store 104, a database 106, a machine intelligence (MI) cluster 108, and a second file store 110. Users can interact with the system 100 using one or more client devices 112, such as a desktop, laptop, tablet, or mobile computing device. In some embodiments, users can interact with the system 100 using a web browser executing on the client device 112. The various components of the system 100 and client devices 112 may be connected as illustrated in FIG. 1 or in any other suitable manner. The system components may be connected by one or more wireless or wireline computer networks.

In some embodiments, database 106 is used to store and manage various statistics and metadata related to neural network training. In certain embodiments, database 106 is used to store information about the state of the cluster 108, such as the number of nodes currently instantiated and address information used to connect to the nodes.

In the embodiment of FIG. 1, the MI compute cluster 108 comprises one or more processing nodes 114a, 114b, . . . , 114n (114 generally). In some embodiments, each of the processing nodes 114 has substantially the same hardware and/or software configuration. In the embodiment of FIG. 1, each processing node 114 comprises a HTTP server 116, visualization tools 118, and an MI processor 120. In certain embodiments, the MI processor 120 comprises TENSORFLOW™, an open-source software library for MI, and the visualization tools 118 comprise TENSORBOARD™, an open-source tool to visualize neural network models (or other MI models) defined as "graphs" within a TENSORFLOW™ application. In other embodiments, the visualization tools 118 and/or MI processor 120 may utilize other open-source or proprietary MI software libraries known to one of ordinary skill in the art. In certain embodiments, the visualization tools 118 include a web-based graphical user interface, and a client device 112 can connect to the HTTP server 116 of a particular processing node 114 in order to access the node's visualization tools 118.

In the embodiment of FIG. 1, the load balancer 102 comprises a connection manager 122 and an MI task manager 124. The connection manager 122 manages network traffic between the client devices 112 to the processing nodes 114. In some embodiments, the connection manager 122 is provided as conventional network load balancer. The MI task manager 124 is responsible for distributing and training neural network models across the MI cluster 108, as well as for managing the compute resources allocated within MI cluster 108.

In some embodiments, the MI task manager 124 can receive a neural network model from a client device 112. For example, a client device may provide a representation of a neural network model in a file format that can be uploaded to the task manager 124 via an Application Programming Interface ("API"), repository clone, Secure Copy Protocol ("SCP"), or other file transfer mechanism. In other embodiments, the MI task manager 124 may retrieve the model from the first file store 104. The received model may specify the number of nodes in each layer of the network along with the connections between layers. Based on an initial analysis of the neural network model, the MI task manager 124 can determine a number of processing nodes that should be allocated for the purpose of training the model. The initial analysis may include, for example, counting the number of nodes and/or connections within the neural network. The MI task manager 124 may compare the number of nodes that it determined should be allocated for the model against the number of processing nodes 114 previously allocated within the cluster 108. If additional processing nodes are required, the MI task manager 124 may allocate the required processing nodes using any suitable technique known in the art. In some embodiments, where the system 100 is hosted within a cloud computing environment, the MI task manager 124 may send a request to a management component of the cloud computing environment to instantiate a new virtual machine having a predetermined hardware and software configuration. Once the processing nodes are initialized and ready to accept a task, the MI task manager 124 can distribute the job of training the neural network model to the allocated processing nodes 114.

In some embodiments, where the MI processor 120 executes an application using TENSORFLOW™, the MI task manager 124 may generate a TENSORFLOW™ graph corresponding to the neural network model, and then generate a set of TENSORFLOW™ "tasks" that participate in the distributed execution of a TENSORFLOW™ graph. The MI task manager 124 may assign each task to a particular TENSORFLOW™ "server" executing on an MI processor 120.

In certain embodiments, data used to train the neural network may be stored in the second file store 110 where it can be accessed by individual processing nodes 114.

In some embodiments, the MI task manager 124 receives neural network load information from the processing nodes 114 and uses the load information to dynamically adjust the number of processing nodes 114 allocated to training a neural network model. The load information may include one or more metrics associated with the training of the neural network model. In some embodiments, the load information includes "time per step," which is the amount of time required to complete each step (e.g., iteration, gradient update, or backpropagation) of the neural network training. If the time per step is above an upper time per step threshold, then the MI task manager 124 may decide to increase the number of allocated processing nodes. Conversely, if the time per step is below a lower time per step threshold, then the MI task manager 124 may decide to decrease the number of allocated processing nodes.

In some embodiments, the time per step thresholds may be calculated using an estimated time to convergence and an accuracy convergence rate, such as follows:

$$\text{time\_per\_step\_threshold}_{upper} = \left(\frac{\text{time\_to\_convergence}}{\text{accuracy\_convergence\_rate}}\right) \times C_1$$

$$\text{time\_per\_step\_threshold}_{lower} = \left(\frac{\text{time\_to\_convergence}}{\text{accuracy\_convergence\_rate}}\right) \times C_2$$

The time to convergence can be estimated/approximated using conventional techniques (e.g., solving for a limit of a series), where the accuracy converge rate can be directly measured, and where $C_1$ and $C_2$ are constants. In particular embodiments, $C_1$ is approximately 1.1 and $C_2$ is approximately 0.9.

In certain embodiments, a user may specify a target time to convergence value. If the estimated time to convergence is substantially greater than the target value, the MI task manager 124 may increase the number of processing nodes. The MI task manager 124 may decrease the number of processing nodes if the estimated time to convergence is substantially less than the target value.

Figure 2:
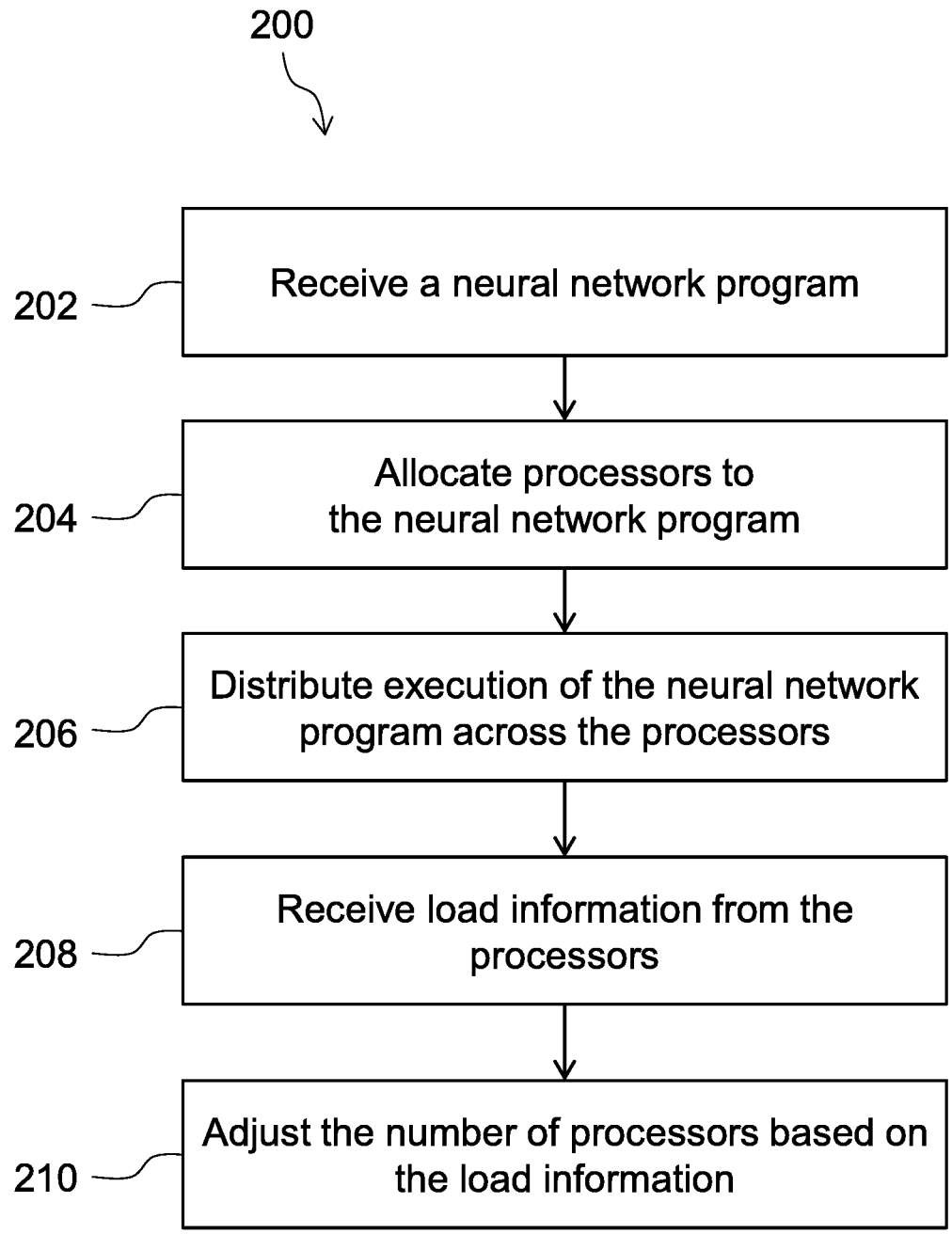
FIG. 2 is a flow diagram showing processing that may occur within the system of FIG. 1, according to some embodiments of the present disclosure.

Referring to FIG. 2, a method 200 can be used to automatically scale an MI cluster based on neural network load information, according to an embodiment of the present disclosure. In some embodiments, the method 200 may be implemented within a load balancer, such as load balancer 102 of FIG. 1.

At block 202, a neural network model is received. In some embodiments, the model is received from a client device. At block 204, a plurality of processing nodes may be allocated for the neural network model. The number of allocated processing nodes may be determined based on an initial analysis of the neural network model. In certain embodiments, the initial analysis may include counting the number of nodes and/or the connections within the neural network. In some embodiments, the initial number of nodes may be calculated based on historical data stored for previously trained neural networks. For example, if a previously trained neural network model has a similar complexity to the newly received model, information about the resources required to train the previous model can be leveraged to select the initial number of processing nodes for the new model.

At block 206, training of the neural network model may be distributed across the allocated processing nodes. For example, a plurality of TENSORFLOW™ tasks may be generated for the neural network model and these tasks may be distributed across TENSORFLOW™ servers executing on the allocated processing nodes. In certain embodiments, training data associated with the neural network model may also be distributed across the allocated processing nodes.

At block 208, neural network load information is received from the allocated processing nodes. The load information may include one or more metrics associated with the training of the neural network model. For example, the load information may include the time per step, accuracy convergence rate, and/or estimated time to convergence metrics.

At block 210, the number processing nodes allocated for the neural network model may be adjusted based on the load information. As one example, the number of nodes may be increased if time per step is above an upper time per step threshold, or decreased if the time per step is below time per step is below a lower time per step threshold. In certain embodiments, the number of nodes may be increased until the time per step is within a given time period specified by the user. In some embodiments, the number of nodes may be doubled in response to determining that additional nodes are needed and/or halved in response to determining that fewer nodes are needed.

Figure 3:
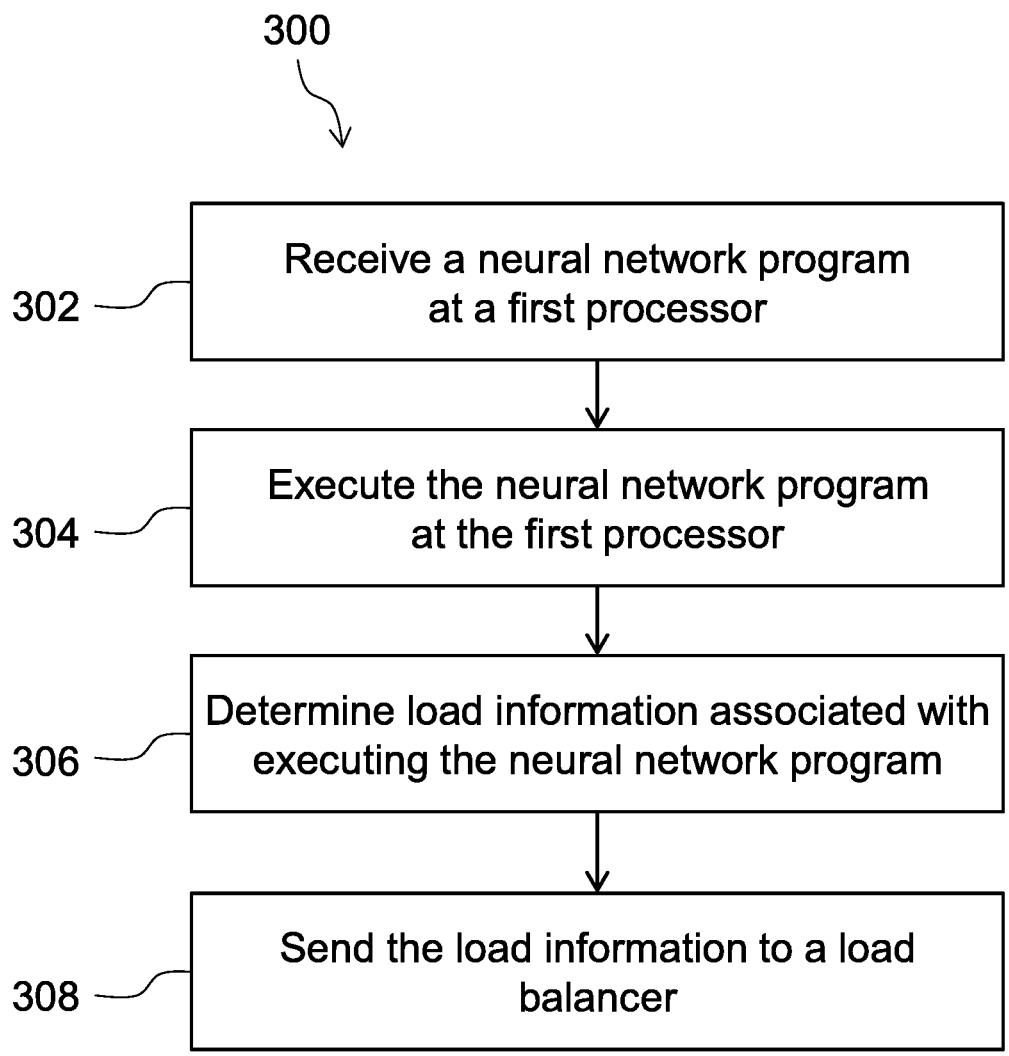
FIG. 3 is another flow diagram showing processing that may occur within the system of FIG. 1, according to some embodiments of the present disclosure.

Referring to FIG. 3, a method 300 can be used to automatically scale an MI cluster based on neural network load information, according to an embodiment of the present disclosure. In some embodiments, the method 300 may be implemented within a processing node of an MI cluster, such as a processing node 114 of FIG. 1.

At block 302, a portion of a neural network model is received at the processing node. For example, a TENSORFLOW™ server executing on the processing node may receive a TENSORFLOW™ task. In certain embodiments, the neural network model is received from a load balancer. In some embodiments, training data (e.g., a subset of a training dataset) may also be received by the processing node.

At block 304, the processing node trains the portion of the neural network model. While the portion of the model is being trained, or after the training is complete, neural network load information is determined (block 306). The load information may include one or more metrics associated with the training of the neural network model, such as time per step, accuracy convergence rate, and/or estimated time to convergence metrics.

At block 308, the processing node sends the load information to a load balancer, such as load balancer 102 of FIG. 1. The load balancer may use the load information to adjust the number of processing nodes allocated to the neural network model.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for automatically scaling a neural network, the method comprising:
   receiving a neural network model;
   allocating a plurality of processing nodes for the neural network model, the number of allocated processing nodes determined based on an analysis of the neural network model;
   distributing training of the neural network model across the allocated processing nodes;
   receiving load information from the allocated processing nodes, the load information associated with the training of the neural network model, the load information comprising a time per step metric associated with the training of the neural network model, wherein the time per step metric comprises an amount of time required to complete a step of the neural network model training; and
   adjusting the number of allocated processing nodes based on the load information, wherein adjusting the number of allocated processing nodes based on the load information comprises at least one of:
      increasing the number of allocated processing nodes if the time per step metric is greater than an upper time per step threshold, or
      decreasing the number of allocated processing nodes if the time per step metric is less than an lower time per step threshold.

2. The method of claim 1 wherein allocating the plurality of processing nodes comprises allocating the plurality of processing nodes at a load balancer.

3. The method of claim 1 wherein distributing training of the neural network model across the allocated processing nodes comprises:
   generating a plurality of tasks associated with training the neural network model; and
   assigning each of the plurality of tasks to one of the allocated processing nodes.

4. The method of claim 1 wherein the time per step metric further comprises an amount of time required to complete a gradient update step.

5. The method of claim 1 wherein the time per step metric further comprises an amount of time required to complete a backpropagation step.

6. The method of claim 1 comprising:
   determining the upper time per step threshold based on an estimated time to convergence metric and an accuracy convergence rate.

7. The method of claim 1 comprising:
   determining the lower time per step threshold based on an estimated time to convergence metric and an accuracy convergence rate.

8. A system comprising:
   a processor; and
   a non-volatile memory storing computer program code that when executed on the processor causes the processor to execute a process operable to:

receive a neural network model;

allocate a plurality of processing nodes for the neural network model, the number of allocated processing nodes determined based on an analysis of the neural network model;

distribute training of the neural network model across the allocated processing nodes;

receive load information from the allocated processing nodes, the load information associated with the training of the neural network model, the load information comprising a time per step metric associated with the training of the neural network model, wherein the time per step metric comprises an amount of time required to complete a step of the neural network model training; and adjust the number of allocated processing nodes based on the load information, wherein adjusting the number of allocated processing nodes based on the load information comprises at least one of:

increasing the number of allocated processing nodes if the time per step metric is greater than an upper time per step threshold, or decreasing the number of allocated processing nodes if the time per step metric is less than an lower time per step threshold.

9. The system of claim 8 wherein allocating the plurality of processing nodes comprises allocating the plurality of processing nodes at a load balancer.

10. The system of claim 8 wherein the computer program code that when executed on the processor causes the processor to execute a process operable to:

generate a plurality of tasks associated with training the neural network model; and assign each of the plurality of tasks to one of the allocated processing nodes.

11. The system of claim 8 wherein the time per step metric further comprises an amount of time required to complete a gradient update step.

12. The system of claim 8 wherein the time per step metric further comprises an amount of time required to complete a backpropagation step.

13. The system of claim 8 wherein computer program code that when executed on the processor causes the processor to execute a process operable to:

determine the upper time per step threshold based on an estimated time to convergence metric and an accuracy convergence rate.

14. The system of claim 8 wherein computer program code that when executed on the processor causes the processor to execute a process operable to:

determine the lower time per step threshold based on an estimated time to convergence metric and an accuracy convergence rate.

15. A non-transitory computer readable medium including one or more instructions which, when executed by one or more processors, cause the one or more processors to perform operations comprising:

receiving a neural network model;

allocating a plurality of processing nodes for the neural network model, the number of allocated processing nodes determined based on an analysis of the neural network model;

distributing training of the neural network model across the allocated processing nodes;

receiving load information from the allocated processing nodes, the load information associated with the training of the neural network model, the load information comprising a time per step metric associated with the training of the neural network model, wherein the time per step metric comprises an amount of time required to complete a step of the neural network model training; and adjusting the number of allocated processing nodes based on the load information, wherein adjusting the number of allocated processing nodes based on the load information comprises at least one of:

increasing the number of allocated processing nodes if the time per step metric is greater than an upper time per step threshold, or decreasing the number of allocated processing nodes if the time per step metric is less than an lower time per step threshold.

* * * * *